US012687742B2

(12) United States Patent
Smith et al.

(10) Patent No.: US 12,687,742 B2
(45) Date of Patent: Jul. 21, 2026

(54) ENCAPSULATION OF THIN FILMS WITHIN EYEGLASS LENSES

(71) Applicant: TRULIFE OPTICS LIMITED, London (GB)

(72) Inventors: Helen Smith, London (GB); Andrii Volkov, London (GB)

(73) Assignee: TRULIFE OPTICS LIMITED, London (GB)

( * ) Notice: Subject to any disclaimer, the term of this patent is extended or adjusted under 35 U.S.C. 154(b) by 306 days.

(21) Appl. No.: 18/550,809

(22) PCT Filed: Feb. 28, 2022

(86) PCT No.: PCT/EP2022/054942
§ 371 (c)(1),
(2) Date: Sep. 15, 2023

(87) PCT Pub. No.: WO2022/194523
PCT Pub. Date: Sep. 22, 2022

(65) Prior Publication Data
US 2024/0160041 A1 May 16, 2024

(30) Foreign Application Priority Data
Mar. 17, 2021 (GB) ...................................... 2103705

(51) Int. Cl.
*G02C 7/02* (2006.01)
*B29D 11/00* (2006.01)

(52) U.S. Cl.
CPC ........ *G02C 7/022* (2013.01); *B29D 11/00009* (2013.01); *B29D 11/0073* (2013.01); *G02C 2202/16* (2013.01)

(58) Field of Classification Search
CPC . G02C 7/022; G02C 7/02; G02C 7/10; G02C 7/12; G02C 2202/16;
(Continued)

(56) References Cited

U.S. PATENT DOCUMENTS

| | | | |
|---|---|---|---|
| 9,581,827 B1 * | 2/2017 | Wong ...................... | G02B 5/305 |
| 2009/0051834 A1 * | 2/2009 | Cottier ................... | G02B 5/286 |
| | | | 264/1.7 |

(Continued)

FOREIGN PATENT DOCUMENTS

| | | |
|---|---|---|
| EP | 1 998 194 A2 | 12/2008 |
| WO | 2014/115095 A2 | 7/2014 |
| WO | 2016/156614 A1 | 10/2016 |

OTHER PUBLICATIONS

International Search Report dated Jun. 3, 2022 from corresponding International Application No. PCT/EP2022/054942, 4 pages.
(Continued)

*Primary Examiner* — William R Alexander
(74) *Attorney, Agent, or Firm* — Ruggiero McAllister & McMahon LLC

(57) ABSTRACT

The disclosure relates to an eyeglass lens, including: a first lens part affixed to a second lens part, with a cylindrically-shaped interface therebetween; and a thin film interposed between the first and second lens parts at the cylindrically-shaped interface. The disclosure also relates to method of manufacturing an eyeglass lens, the method including: interposing a thin film between a first lens part and a second lens part, at a cylindrically-shaped interface between the first and second parts.

16 Claims, 7 Drawing Sheets

(58) Field of Classification Search
CPC .......... B29D 11/00009; B29D 11/0073; B29D 11/00; G02B 3/06; G02B 3/00; G02B 2003/0093; G02B 27/01; G03H 1/0252
USPC .................................................... 351/159.01
See application file for complete search history.

(56)                References Cited

U.S. PATENT DOCUMENTS

| | | |
|---|---|---|
| 2015/0131047 A1 | 5/2015 | Saylor et al. |
| 2017/0068095 A1 | 3/2017 | Holland et al. |
| 2017/0075143 A1* | 3/2017 | Saylor .................... G02C 7/101 |
| 2018/0120579 A1 | 5/2018 | Gollier et al. |
| 2019/0235282 A1* | 8/2019 | Coppa .............. B29D 11/00634 |

OTHER PUBLICATIONS

Written Opinion dated Jun. 3, 2022 from corresponding International Application No. PCT/EP2022/054942, 5 pages.
Jalie, M., "The Principles of Ophthalmic Lenses—Chapter 3", Fourth Edition, 1988, 13 pages.

* cited by examiner

201

202 y x z

203 x z 401                  402

*y*

*x*

*z*

403

*x*

*z*

Fig. 5A
Fig. 5B
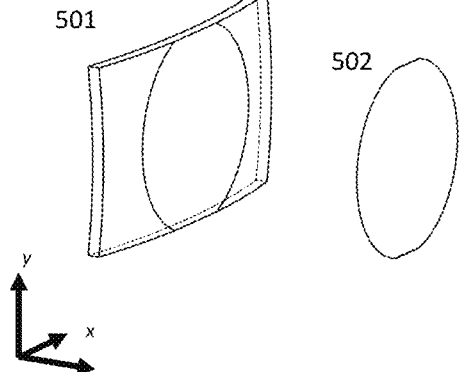
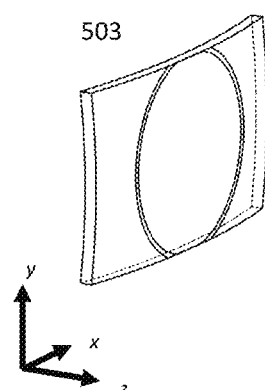

ENCAPSULATION OF THIN FILMS WITHIN EYEGLASS LENSES

CROSS-REFERENCE TO RELATED APPLICATIONS

This application is a national stage application, filed under 35 U.S.C. § 371, of International Patent Application No. PCT/EP2022/054942, filed on, Feb. 28, 2022, which claims priority to United Kingdom Patent Application No. 2103705.6, filed on Mar. 17, 2021, the entire contents of each of which is incorporated by reference herein in its entirety.

BACKGROUND

1. Field of the Disclosure

The disclosure concerns an eyeglass lens with an encapsulated thin film and a lens manufacturing and/or thin film encapsulation technique to produce an eyeglass lens with encapsulated thin film.

2. Description of the Related Art

Eyeglass lenses are typically manufactured via lens grinding or injection moulding techniques. The injection moulding process for an eyeglass lens consists of injecting the molten material into a mould under high pressure. The mould is shaped either with a blank shape (to create a lens 'blank' with the intention of further shaping the inner surface to create the final lens) or with the exact contours of the desired eyeglass lens, including the inner and outer curvature profiles. After a short cooling time, the lens is complete. Due to the ease and speed of this process, injection moulding is the technique of choice for large batches and stock lenses such as sunglasses. For more bespoke applications, lens grinding techniques are favoured. The lens grinding process starts with a lens 'blank', which has a convex outer (world facing) surface and either a planar, or concave eye-facing surface. The curved surface or surfaces of these blanks are typically spherical or spherocylindrical in profile. The inner surface is then ground using specialist machinery to the desired curvature profile and polished. The eyeglass lens is then edged to the desired edge profile to fit in a frame and the eyeglass is completed. With the advent of 3D printing (or additive manufacturing) technology, it is also possible to 3D print eyeglass lenses with entirely bespoke curvatures and edge profiles.

Laminating thin films on eyeglass lenses, or encapsulating them within eyeglass lenses, is desirable for many purposes. For example, the Augmented Reality (AR) industry (including eye tracking applications) desires Holographic Optical Elements (HOEs) that can be produced on thin polymer films to be then affixed to, or encapsulated within, the eyeglass lens.

There are existing approaches for encapsulating thin films within eyeglasses or laminating thin films on eyeglasses. For example, US-2015/0131047 A1 details processes for the direct lamination of cellulose acetate laminated films onto eyeglasses of varying profile for use in safety glasses. US-2017/0068095 A1 describes a number of techniques. In a first of these, a lens is injection moulded, whereby a mould is made with a cavity to position a HOE photopolymer film prior to casting. The eyeglass material is then injected into the mould, encapsulating the HOE within. A second technique encapsulates the HOE between two half-lenses, comprising a back portion of the eyeglass lens and a front portion of the eyeglass lens. The HOE is sandwiched at the interface of the two eyeglass lens components. In a third approach, a photopolymer film is directly laminated to the concave inner surface of the eyeglass lens.

Known approaches involve complex manufacturing techniques or risk deformations and/or delamination of the thin film. A less complex manufacturing technique for integrating a thin film with an eyeglass lens without such significant difficulties is therefore desired.

SUMMARY

Against this background, there is provided an eyeglass lens according to claim 1 and a method of manufacturing an eyeglass lens in line with claim 8. There is provided a technique to create an eyeglass lens with encapsulated thin film and a resultant eyeglass lens with the encapsulated thin film, whereby the stresses and deformations are minimised. This is achieved by providing the thin film on a cylindrically-shaped interface between two parts of the eyeglass lens.

It has been found that many stresses and deformations when encapsulating a thin film in a lens are induced by laminating on a curved surface and specifically, a surface that is curved across two axes, as are typical eyeglass lenses. Laminating a film directly on a surface with spherical curvature (or other curvature profiles across two axes, which are often chosen for minimum thickness) generates elastic stresses in the film leading to deformations and delamination.

In contrast, it has been discovered that such stresses are avoided when laminating the thin film on a cylinder shaped surface. For completeness, it is noted that a cylinder shaped surface means that the surface has a shape of a portion of a cylinder along its axis of elongation. In other words, the surface is curved (for instance, circularly-shaped or elliptically-shaped) along one dimension, but straight (or flat) along the perpendicular dimensions. A cylindrical shaped interface is highly unconventional, especially as it does not conform to the shape of the eyeglass lens and was therefore viewed as non-compact. However, it may still provide low thickness, without difficulty in lamination.

The eyeglass lens may therefore be produced using two component parts with the thin film being encapsulated between them. The lens may hence be created using two components: a back (eye-facing) section; and a front (world-facing) section. The interface between the two components has the cylindrical shape discussed above. In other words, taking a cross-section along one plane, preferably the plane parallel to the major axis (normally horizontal), shows the interface as curved (for example, a circular or elliptical segment). A cross-section along the perpendicular plane, typically parallel to the minor axis (generally vertical), is preferably flat or straight. Restricting the curvature across the minor axis (preferably to zero) allows for the thinnest stack and places least restrictions on the choice of inner and outer curvatures.

In a simple case, a lens of spherical or spherocylindrical outer profile (as is typically for a normal prescription eyeglass lens) may be split or formed into two component parts, where the interface between the two components is of cylindrical profile. Laminating the thin firm on the cylindrical surface results in low deformation and delamination risk. As this surface only has curvature in one axis, it does not cause the same stresses on the thin film compared with lamination on a spherical surface.

The two parts may be made by any technique, for example: an injection moulding technique, as typically used for batch production; a grinding and polishing technique, often used for more bespoke requirements; or 3D printing. Optionally, the thin film may be integrated with one of the lens parts (so as to sit at the formed interface), for example by placing the thin film within a mould before casting. After bonding the two lens parts with the thin film interposed therebetween (whether any lens part is formed integrally with the thin film or not), the resultant eyeglass lens may be considered a blank. An eye-facing surface of the blank may then be milled to form the eyeglass lens.

A typical eyeglass is a meniscus lens, meaning that the eye-facing surface is concave, and the world facing surface is convex. A typical eyeglass will also exhibit a certain aspect ratio (thereby defining a major axis and a minor axis), whereby the horizontal extent of the lens (the major axis) is larger than the vertical extent (the minor axis). This aspect ratio beneficially allows bisection of the eyeglass lens into two components for the purpose of encapsulating the thin film.

The thin film is preferably non-isotropic. Typically, the thin film comprises a holographic optical element (HOE), which may act as a reflective or transmissive element. In some embodiments, the HOE may acts as a plane mirror or a plane transmission hologram, without optical power. Alternatively, the HOE may add optical power, so that the total optical power of the HOE is the sum of the optical power of the hologram and optical power due to a curvature of the cylindrically-shaped interface.

The thin film may initially be a photosensitive material and the HOE may be formed by recording a hologram on the photosensitive material. In some embodiments, the hologram may be recorded when the photosensitive material is on a planar substrate and then laminated to the cylindrical interface. In that case, the hologram is advantageously recorded so as to compensate for the cylindrically-shaped interface. In other embodiments, the hologram may be recorded when the photosensitive material is applied to the cylindrically-shaped interface. In that case, no additional compensation for the cylindrically-shaped interface is needed.

Combinations of aspects or features from aspects may also be considered, where such combinations are feasible.

BRIEF DESCRIPTION OF THE DRAWINGS

The disclosure may be put into practice in a number of ways and preferred embodiments will now be described by way of example only and with reference to the accompanying drawings, in which:

FIG. 5A depicts component parts of the eyeglass lens of FIG. 4A.

FIG. 5B schematically illustrates an assembled form of the component parts of FIG. 5A.

The drawings are all schematic in nature and exact dimensions and structure should not be inferred unless expressly shown or described.

DETAILED DESCRIPTION

Figure 1:
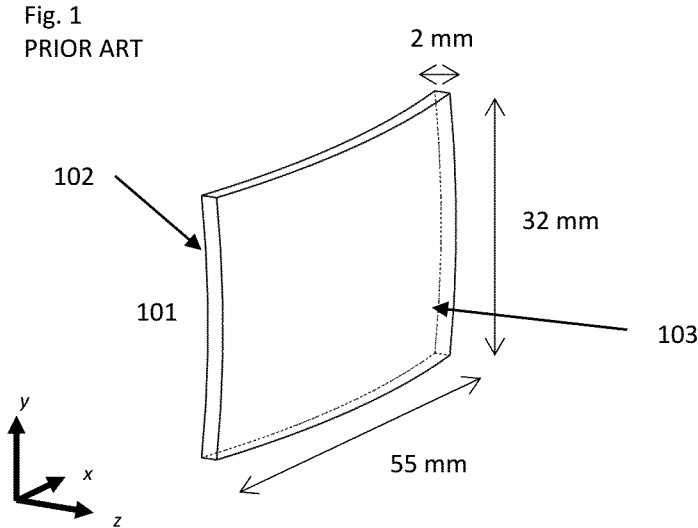
FIG. 1 shows a perspective view of an existing eyeglass lens.

Referring first to FIG. 1, there is shown a perspective view of an existing eyeglass lens 101, having an eye-facing surface 102 and a world facing surface 103. This is a simple zero power spherical lens (as are other eyeglass lenses shown in the drawings) and is used for illustrative purposes only. It will be recognised that embodiments may be applied to other eyeglass lenses, including prescription eyeglass lenses and eyeglass lenses with varied curve profiles.

A typical eyeglass is a meniscus lens, meaning that the eye-facing surface 102 is concave, and the world facing surface 103 is convex. As noted above, the eyeglass lens 101 shown has a spherical radius of curvature on both the inner and outer surfaces. Simple spherical lenses are often used for zero power stock lenses, for applications including sunglasses and ski goggles. In this application, both the front and back surfaces have spherical curvature where the two curvature profiles are concentric. For prescription lenses, cylindrical power is often added to the back lens surface 102 to correct for astigmatism. However, the surface is normally spherocylindrical (as described in "Principles of Ophthalmic Lenses", M Jalie, Fourth Edition, Chapter 3, Association of British Dispensing Opticians College of Education). Typical dimensions of the eyeglass lens are shown for illustration only.

Also shown in FIG. 1 are axes, which will be used consistently in other drawings of the disclosure. The eyeglass lens 101 typically has a major axis in the horizontal (x) direction and a minor axis in the vertical (y) direction. A depth (z) dimension of the eyeglass lens 101 is typically negligible (or at least significantly smaller, normally by a factor of at least 10) compared with the sizes in other dimensions.

Eyeglass lenses typically have a spherical curvature on the outer (world-facing) surface which is commonly known as "base curvature". This base curvature serves a functional purpose in providing best optical performance of the lens, whilst also serving to improve aesthetics and reduce the weight of the lens. A 6 dioptre curve front surface (equating to a radius of curvature of about 83 mm) is considered 'best form' (based on empirical data) to give best peripheral vision. Reading glasses and fashion lenses often have slightly flatter surfaces for aesthetic reasons, with a base curve of 4 dioptres being commonplace.

For further information (but again, not specific limitation), it is noted that the shown eyeglass lens 101 has a horizontal extent of the lens (along the x-axis) of 55 mm and a vertical extent of the lens (along the y-axis) of 32 mm. The lens has uniform thickness 2 mm, with inner (eye facing) radius of curvature 150 mm (approximately 3.3 dioptres), and outer (world facing) radius of curvature 152 mm. This is typical of a zero power stock lens, but as noted above, 6 dioptre or 4 dioptre lenses may be more commonplace. A prescription lens will have a varied thickness profile.

Figures 2A, 2B:
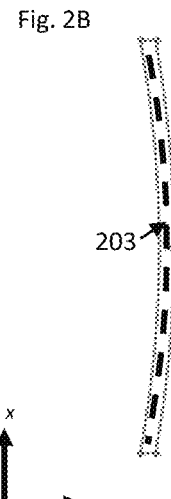
FIG. 2A depicts a perspective view of an eyeglass lens according to the disclosure.
FIG. 2B illustrates a cross section through the eyeglass lens of FIG. 2A.

Reference is now made to FIG. 2A, in which there is depicted a perspective view of an eyeglass lens 201 according to the disclosure. According to the present disclosure, a thin film is encapsulated in the eyeglass lens by forming the eyeglass lens in two components, where the interface between the two parts is a cylindrical profile. The parameters of a thin film are generally well understood, but in this context, a thin film may have a thickness of the order of 100 microns or less. It is typically a low absorption, optically clear (or transparent) low haze film, suitable for incorporation within a lens without significantly affecting see through. There is highlighted a reference plane 202 central to the eyeglass lens in the xz plane. Reference is also made to FIG. 2B, in which there is illustrated a cross section through the eyeglass lens of FIG. 2A at the reference plane 202. Here, a cylindrical interface profile 203 between the two component parts is shown as a dotted line.

The two component parts are typically fabricated separately, but may optionally be formed from a divided eyeglass lens. A cylindrical surface on a lens or lens component is not typical. The cylindrical surface between the two lens components may be made by grinding or bespoke moulds (injection moulding). Optionally, 3D printing may be used to make the lens components. Manufacturing lens components with a cylindrical interface is not a standard technique. Nevertheless, it is possible using injection moulding (for example of plastic), grinding or 3D printing. Standard lens grinding and mould manufacture may use diamond turning, which would normally imply a spherical surface, but this technique and other techniques may be used to achieve a cylindrical surface instead.

Figure 3A:
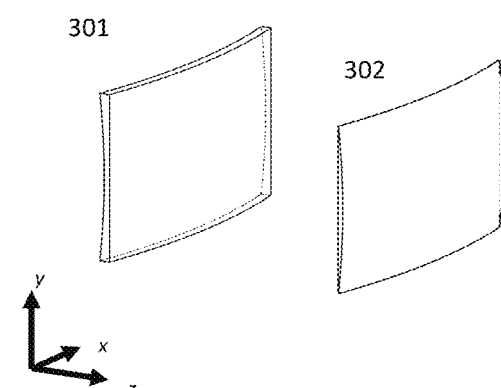
FIG. 3A depicts component parts of the eyeglass lens of FIG. 2A.

Referring next to FIG. 3A, there is depicted component parts of the eyeglass lens of FIG. 2A. These comprise: a first component part (incorporating the eye-facing surface) 301; and a second component part (incorporating the world-facing surface) 302. The interface between the first component part 301 and the second component part 302 has a cylindrical shape (as shown in FIG. 2B), which is curved (in this case, a circular segment) in the xz plane and flat in the yz plane (and also flat in the xy plane).

In this example, the cylindrical shape is curved, specifically with a radius of curvature of 151 mm, in the x-axis and the profile is flat in the y-axis. It can therefore be seen that the use of a pure cylindrical interface between the two parts allows for the formation of two components, each having dimensions of 55 mm (x) by 32 mm (y) components (that is the same dimensions in the major and minor axes of the eyeglass lens), which combine to make the final eyeglass lens. The centre thickness of each component is approximately 1.3 mm.

A thin film (not shown in FIG. 3A) of the same size (55 mm in x-dimension and 32 mm in the y-dimension) and profile of the eyeglass is laminated on the cylindrical interface between the first component part 301 and the second component part 302. When the first component part 301 and the second component part 302 are then attached to each other, the thin film is entirely encapsulated within the eyeglass lens. The lamination on a cylindrical surface avoids the deformations associated with laminating on a spherical surface. The interface is preferably a pure cylinder, but can be partially spherocylindrical or toric, as long as any deviation from a pure cylindrical shape is negligible. The closer the interface is to a perfect cylinder, the more stresses in the thin film are minimised. The thin film is preferably a holographic optical element (HOE) or a photosensitive material suitable for recording a HOE therein.

As noted above, the cylindrical interface between the first component part 301 and the second component part 302 is flat in one axis. Therefore, it exhibits in this axis the same geometric restrictions as using a flat thin film. However, since eyeglass lenses typically have a significant aspect ratio, this restriction becomes less important if it only applies across the shorter (minor) axis of the eyeglass lens, as will now be further discussed below.

Attachment of the thin film to the cylindrically shaped surface of one of the lens components may be achieved in a number of ways. Lamination of the thin film may not require adhesion of the thin film to one or both surfaces of the cylindrical interface (the first component part 301 and the second component part 302 may simply be attached to each other with the thin film therebetween), but addition adhesion may be provided. The HOE may be a photopolymer, for example Bayfol® HX (as marketed by Covestro AG), which typically has a substrate of about 60 microns thickness and a polymer layer of around 20 microns thickness. Then, one side of the photopolymer is typically a tacky film that will adhere to glass or plastic once laminated onto the surface using a roller (or similar). It is alternatively or additionally possible to use glue, double sided tapes, vacuum treatment, thermal treatment or pressure treatment to adhere the HOE to the substrate. The HOE could instead be a silver halide film and the above mentioned techniques may also be used to adhere the thin film to the substrate surface. The choice of lens material can help with adhesion, for example, polycarbonate may give better adhesion. The thin film typically does not extend quite to the edge of the cylindrical interface. This may allow for better encapsulation (no moisture ingress), if there is a good glue seal all around.

Figure 3B:
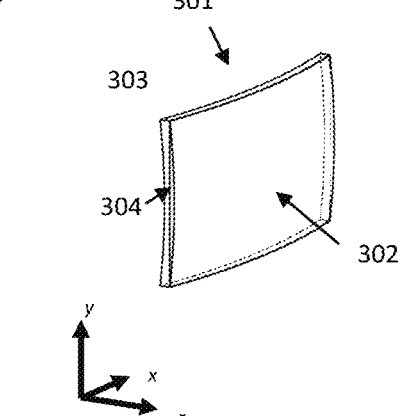
FIG. 3B schematically illustrates an assembled form of the component parts of FIG. 3A.

Referring to FIG. 3B, there is schematically illustrated an assembled eyeglass lens 303 from the component parts of FIG. 3A. Also shown is thin film 304 encapsulated between the first component part 301 and the second component part 302. Hence, the finished eyeglass lens 303 is created by the two components part mated together by the cylindrical interface with the thin film 304 between them.

The eye-facing component (first component part 301) may be moulded with the desired shape for the eyeglass lens. More typically, it is moulded as a lens blank, in which the component will have the cylindrical profile on a front surface (to be bonded to the world-facing component 302), but the back surface may be planar or have some arbitrary surface curvature. The first component part 301, second component part 302 and thin film 304 are then bonded to form the eyeglass lens 303 as a lens 'blank' with embedded HOE.

Once the assembled eyeglass lens 303 is formed in this way, it will then appear as a circular profile lens blank and the back surface may be milled as a standard lens blank to produce the final lens. In order to fit eye glasses, the front and back curvatures are typically edged (ground down around the edges) to fit in frames of eye glasses. This processing can be performed to the first component part 301 and the second component part 302, before encapsulation of the thin film and assembly, or after assembly. A grinding process, when the front and/or back surfaces are ground to a curvature is a more violent process than edging and if required, it is preferred that this is performed to the first component part 301 and/or the second component part 302, before encapsulation of the thin film and assembly.

Hence, the world-facing component is typically formed to comprise a front surface which is typically spherical with the desired base curvature and a back surface which has the cylindrical profile. The eye-facing component may be formed to comprise a front surface with cylindrical profile and a back surface. This back surface may be formed with the desired curvature for the final prescription. Alternatively, the back surface may be left planar (or with arbitrary curvature) to create a lens blank, whereby further milling of this surface will be used to set the prescription.

Figures 4A, 4B:
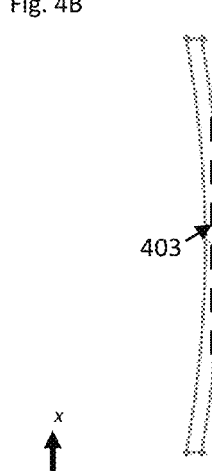
FIG. 4A shows a perspective view of an example alternative eyeglass lens.
FIG. 4B illustrates a cross section through the eyeglass lens of FIG. 4A.

Referring now to FIG. 4A, there is shown a perspective view of an example alternative eyeglass lens 401. This alternative eyeglass lens 401 does not have a cylindrical interface between the two lens components, but rather a planar interface. This is shown for comparison purposes. There is highlighted a reference plane 402 central to the eyeglass lens in the xz plane. Reference is also made to FIG. 4B, in which there is illustrated a cross section through the eyeglass lens of FIG. 4A at the reference plane 402. Here, a planar (flat) interface profile 403 between the two component parts is shown as a dotted line.

Referring now to FIG. 5A, there is depicted component parts of the eyeglass lens of FIG. 4A. These comprise: a first component part (incorporating the eye-facing surface) 501; and a second component part (incorporating the world-facing surface) 502. The interface between the first component part 501 and the second component part 502 has a flat, planar shape (as shown in FIG. 4B), which is flat in all of the xz, yz and xy planes. A thin film (not shown) may be encapsulated between the first component part 501 and the second component part 502. Lamination on a planar interface between the first component part 501 and the second component part 502 is straightforward.

Finally, reference is made to FIG. 5B, in which there is schematically illustrated an assembled eyeglass lens 503 formed from the component parts of FIG. 5A. This shows how the first component part 501 and the second component part 502 combine to make the final eyeglass lens 503. It can be seen that the join between the first component part 501 and the second component part 502 lies away from the edges of the eyeglass lens 503 towards the centre of the lens 503.

Thus, bisecting the same eyeglass lens by way of a flat intersection, rather than a cylindrical interface, means that the horizontal extent of the outer (world-facing) part is limited, as shown by eyeglass lens 503. This restricts the possible size of the thin film that can be encapsulated within the eyeglass. Although it is possible to laminate a small area of thin film on this surface and encapsulate it, it is preferable for any thin film encapsulated within the eyeglass to extend close to the edges of the eyeglass lens. This prevents visible edges and aids with the lamination process. If a planar intersection is chosen (as shown in FIG. 4 and FIG. 5), but the size of the thin film is needed to match the size of the eyeglass, this can be achieved by making the entire eyeglass thicker or by reducing the curvature profiles. Therefore, it can be seen that the cylindrical (curved) interface between the two component parts allows for a thinner stack to be used, whilst also affording the most flexibility in choice of profiles of the curvatures. Consequently, the final encapsulated eyeglass lens is thinner, lighter, less expensive and more consumer friendly than an encapsulated eyeglass lens made using a different method.

Figure 6A:
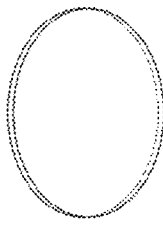
FIG. 6A depicts an example round lens blank.

These benefits with be further discussed with reference to an example with reference to FIG. 6A, depicting an example round lens blank. This shows a 70 mm diameter lens blank with inner radius of curvature 250 mm, thickness 2.6 mm and outer radius of curvature 252.6 mm (therefore fully concentric surfaces).

Figure 6B:
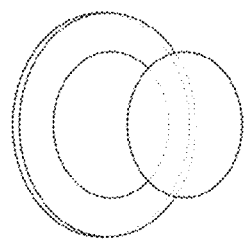
FIG. 6B illustrates an exploded view of the lens blank of FIG. 6A bisected according to a planar interface.

Referring next to FIG. 6B, there is illustrated an exploded view of the lens blank of FIG. 6A bisected according to a planar interface. Bisecting the lens blank into two component parts with a planar interface (for instance, as discussed with reference to FIGS. 4 and 5), results in a centre thickness for each component part of 1.3 mm. As discussed above, the planar intersection does not reach the full extent of the 70 mm lens blank used in this example. In the resultant components, the outer world facing part has a diameter of less than 70 mm. Therefore, if a thin film is to be laminated on the interface between the two parts, the size of the film is limited to the size of the world facing component.

Figure 6C:
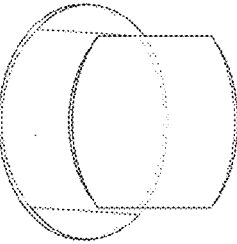
FIG. 6C illustrates an exploded view of the lens blank of FIG. 6A bisected according to a cylindrically-shaped interface.

Now referring to FIG. 6C, there is illustrated an exploded view of the lens blank of FIG. 6A bisected according to a cylindrically-shaped interface. Bisecting using a cylindrical, rather than planar interface, is also discussed with reference to FIGS. 2 and 3 above. As the interface is flat in one axis (vertical), the world-facing component is limited in one axis to the same extent as for the planar interface. However, it is no longer limited in the other (horizontal) axis. This is beneficial, as most eyeglass components have an aspect ratio whereby the horizontal axis is longer than the vertical, as shown with reference to FIGS. 2 and 3.

Figure 7:
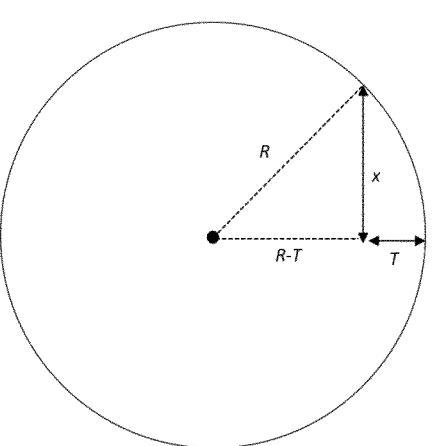
FIG. 7 schematically shows a relationship between radius of curvature and centre thickness on the size of a spherically-shaped world-facing lens component.

Referring now to FIG. 7, there is schematically shown a relationship between radius of curvature and centre thickness on the size of a spherically-shaped world-facing lens component. Assuming a spherically curved world facing component, with radius of curvature R and centre thickness T, the radius, x, of the world-facing component is given by the following expression:

$$x = \sqrt{R^2 - (R - T)^2}.$$

Therefore, it can be seen that the size of the world-facing component is limited by two factors: (1) the thickness on the lens; and (2) the radius of curvature of outer surface. To fit a larger thin film in a planar interface between the eye-facing and world-facing components would therefore mean making the lens thicker or reducing the radius of curvature. Both of these may be undesirable for eyeglass frames for practical and/or aesthetic reasons.

In general terms and in a first aspect, there may be considered an eyeglass lens, comprising: a first lens part affixed to a second lens part, with a cylindrically-shaped interface therebetween; and a thin film interposed between the first and second lens parts at the cylindrically-shaped interface. There may also be considered an optical device, for example optical glasses, a visual headset or similar, comprising one or more than one eyeglass lens according to this aspect.

In a second aspect, which may be combined with the first aspect, there may be considered a method of manufacturing an eyeglass lens. The method comprises interposing a thin film between a first lens part and a second lens part, at a cylindrically-shaped interface between the first and second lens parts. The resultant eyeglass lens (which may involve the first and second lens parts being bonded with the thin film interposed between) may therefore be according to the eyeglass lens of the first aspect (as discussed above) or an intermediate product, such as an eyeglass lens blank, from which a final eyeglass lens may be formed.

According to either (or both) aspects, a number of optional and/or preferable features may be considered. For example, the eyeglass lens may be generally elongated and/or may have a (longer) major axis (typically horizontal)

and a (shorter) minor axis (vertical). For example, the eyeglass lens may be roughly trapezoidal (or rectangular), oval or a shape between these two options. In any event, the cylindrically-shaped interface preferably has a curved profile across the major axis of the eyeglass lens. Then, the cylindrically-shaped interface advantageously has a straight (or flat) profile across the minor axis. In certain embodiments, the eyeglass lens has a spherical or spherocylindrical outer profile.

Advantageously, the first lens part has a first cylindrically-shaped surface and the second lens part has a second cylindrically-shaped surface. Then, the second cylindrically-shaped surface is beneficially arranged to cooperate with the first cylindrically-shaped surface so as to provide the cylindrically-shaped interface.

Further generalised aspects will be discussed below. Firstly, more specific details according to embodiments will be considered.

As noted above, the thin film is typically a holographic optical element (HOE), which is an optical component that produces holographic images using principles of diffraction and may be understood as a type of hologram. A HOE is typically recorded on a flat or planar surface. In this case, if the thin film is to be laminated or encapsulated into an eyeglass lens, whereby the resultant HOE has a curved profile, compensation for this curvature and/or for the rear (eye-facing) lens component part (which may refract the replay light before it hits the HOE)_is incorporated in the recording setup. By compensating for this curvature, the HOE will replay correctly in its final, curved, state.

If the eyeglass lens components as described herein are of suitable low birefringence plastic or glass, for example, then the HOE can preferably be directly recorded (in the dark) on the thin film when it is laminated on one of the lens components (before or after encapsulation). No compensation for the curvature of the eyeglass lens or HOE is included in recording and the optimal optical performance of the HOE is maintained in any event. However, compensation for angular change introduced by the rear (eye-facing) lens component part may still be desirable if the HOE is not totally encapsulated before recording (or the replay position may be altered subsequently). Furthermore, avoiding re-lamination of the thin film between recording and implementation (that is, removing the film from a flat recording surface and re-laminating onto a curved surface) can be advantageous. This avoids re-lamination issues such as de-registration and avoids added stress on the thin film. However, it is difficult to implement from a practical perspective.

Alignment of the optical system is desirable, particularly for augmented reality (AR) applications, to provide a high quality (un-aberrated, high resolution) virtual image to the viewer. The optical centre of the HOE is desirably aligned within the eyeglass lens, preferably with a precision of +/−0.1 mm relative to the optical axis of the projector or light source. Therefore, if the HOE needs to be removed from a planar surface (upon which it was recorded) and re-laminated on a curved surface for encapsulation within eyeglasses it is critical that the lamination is as easy as possible to allow for accurate alignment of the HOE. The cylindrical inner surface described herein allows for easier lamination than a spherical inner surface and hence easier alignment. A HOE can alternatively be recorded on a reel-reel system and laminated in an automated process. Again, this procedure is more straightforward on a cylindrical, rather than spherical, surface.

The optical quality and stability of the HOE is also relevant for AR applications. Any variation in position or thickness of the HOE will negatively influence quality of the virtual image. The HOE is an optical element and optical elements are typically specified to an accuracy of 1 wavelength or less. This indicates that, if the HOE varies from the nominal position by more than 1 wavelength of light, the image will be affected. This variation may occur, for example, if lamination on a spherical surface causes wrinkles or stresses in the HOE. The surface onto which the hologram is laminated is desirably of optical quality smoothness, position stability and of a known curvature and the hologram desirably remains conformal to the surface after encapsulation for optimal image quality. It is noted that some existing methods for laminating films within eyeglasses (for example, cellulose acetate film for laminated safety glasses, photochromic film for sunglasses) need not be concerned with precise positional accuracy when laminating, as the films are largely isotropic (that is, identical in all positions/orientations).

Returning to the generalised aspects discussed above, further details can be considered. Beneficially, the thin film comprises a holographic optical element. Preferably, the thin film is largely or mostly non-isotropic (that is, non-identical in all or at least most or the vast majority of positions/orientations).

In some embodiments, the holographic optical element is configured to act as a plane mirror. In this case, the holographic optical element may add no optical power itself. The total optical power of the HOE may then be determined by the cylindrical curvature of the inner surface onto which the HOE is laminated. The eyeglass lens exhibits optical power on the real world as determined by the inner and outer surface curvatures of the eyeglass lens only.

Alternatively, the eyeglass lens may be configured such that the total optical power of the holographic optical element is determined by a sum of an optical power of the hologram of the holographic optical element and an optical power due to a curvature of the cylindrically-shaped interface. Then, the HOE may act as a reflective powered optical element (as is typical for AR applications).

In some embodiments, the thin film comprises a photosensitive material. Then, a hologram may be recorded on the photosensitive material to form a holographic optical element. In certain cases, recording a hologram on the photosensitive material may comprise: providing the photosensitive material on a planar substrate; and recording the hologram on the photosensitive material when on the planar substrate, the hologram being recorded so as to compensate for an optical power of the cylindrically-shaped interface. This may thereby provide the holographic optical element, which may then be applied to the cylindrically-shaped interface. In other cases, recording a hologram on the photosensitive material may comprise: applying the photosensitive material to the cylindrically-shaped interface; and recording the hologram on the photosensitive material when on the cylindrically-shaped interface.

Although a specific embodiment has now been described, the skilled person will appreciate that various modifications and alternations are possible. It is of course to be understood that variations on the design distances, dimensions, curvatures, angles and component sizes are possible without changing the underlying disclosure. Also, further optical components can be incorporated to redirect and/or process the light as desired.

Whilst it is preferred that the curved cylinder shape is across the major (horizontal) axis and the interface profile is straight across the minor (vertical) axis, it may be possible to implement approaches according to the disclosure with the curved cylinder shape across the minor (vertical) axis and with the interface profile straight across the major (horizontal) axis. Also, the curved cylinder shape may be at an angle to the major and minor axes of the eyeglass lens component shape, for example at 45 degrees.

In some applications, it may be possible for the interface between the two eyeglass lens components to be curved in two axes. However, in this case the curvature of the interface in the minor or vertical axes is minimised, with the ideal curvature is zero. In other words, any deviation from non-zero curvature in the minor axis is negligible. Any curved shape (for example, across the major axis) is possible.

A typical HOE in an AR system is a reflective hologram. However, a transmission HOE can be used instead or as well. Transmissive AR applications are known in practice. A transmission HOE could have optical power in some cases, but alternatively could have no optical power and may then be termed a plane transmission element or hologram (a transmissive equivalent to a plane mirror)

The outer shape (profile) of the eyeglass lens is preferably spherical or spherocylindrical, but could be toric or aspheric in some embodiments. Such shapes are less common and generally more expensive to manufacture.

The manufacturing process discussed above first forms the two lens component parts and then encapsulates the thin film (HOE) between them. However, these steps may be integrated and in particular, the thin film (HOE or photo-sensitive material from which a HOE may be formed) may be formed integrally with first lens part or second lens part. The lens part is advantageously formed such that the thin film sits at the interface. For example, this may be achieved if at least one of the lens component parts is formed by injection moulding. Then, the thin film may be incorporated into the casting process when creating either of the component parts. The thin film is placed so that it lies against the cylindrical side of the mould for the lens component (the interface). The resin is then injected and the film is bonded to the component via the casting (rather than by lamination). As a result, two lens components may be formed, but one will already have the thin film fused on the interface.

In relation to the general terms discussed above, for example, further options may be considered. For instance, the thin film may be formed integrally with the first lens part or the second lens part in embodiments. One of the lens parts may be considered to have an eye-facing surface (opposite the cylindrical interface surface). This may be formed with an arbitrary shape. After bonding the two lens parts with the thin film encapsulated therebetween, the resultant product may be considered an eyeglass lens blank. The eye-facing surface of the eyeglass lens blank may be milled to form the eyeglass lens.

An eyeglass lens (or lenses) according to the disclosure may typically be used for AR applications. Applications other than AR might include eye tracking and a reflective filter for specific wavelengths of light (for example some infrared light or laser light to avoid distraction or damage). It may be possible (but more difficult) to use an eyeglass lens (or lenses) according to the disclosure for virtual reality (VR) applications as well.

The invention claimed is:

1. An eyeglass lens, comprising:
a first lens part affixed to a second lens part, with a cylindrically-shaped interface therebetween; and
a thin film interposed between the first and second lens parts at the cylindrically-shaped interface, wherein the thin film comprises a holographic optical element recorded to compensate for an optical power of the cylindrically-shaped interface.

2. The eyeglass lens of claim 1, wherein the eyeglass lens has a major axis and a minor axis, the cylindrically-shaped interface having a curved profile across the major axis.

3. The eyeglass lens of claim 2, wherein the cylindrically-shaped interface has a straight profile across the minor axis.

4. The eyeglass lens of claim 1, wherein the thin film comprises a holographic optical element and/or wherein the thin film is non-isotropic.

5. The eyeglass lens of claim 4, wherein the holographic optical element is configured to act as a plane mirror or a plane transmission hologram.

6. The eyeglass lens of claim 4, wherein the eyeglass lens is configured such that the total optical power of the holographic optical element is determined by a sum of an optical power of a hologram of the holographic optical element and an optical power due to a curvature of the cylindrically-shaped interface.

7. The eyeglass lens of claim 1, wherein the eyeglass lens has a spherical or spherocylindrical outer profile.

8. A method of manufacturing an eyeglass lens, the method comprising:
interposing a thin film between a first lens part and a second lens part, at a cylindrically-shaped interface between the first and second parts, wherein the thin film comprises a photosensitive material, the method further comprising:
recording a hologram on the photosensitive material to form a holographic optical element and wherein the step of recording a hologram on the photosensitive material comprises:
providing the photosensitive material on a planar substrate; and
recording the hologram on the photosensitive material when on the planar substrate, the hologram being recorded so as to compensate for an optical power of the cylindrically-shaped interface.

9. The method of claim 8, wherein the first lens part has a first cylindrically-shaped surface and the second lens part has a second cylindrically-shaped surface, the second cylindrically-shaped surface arranged to cooperate with the first cylindrically-shaped surface so as to provide the cylindrically-shaped interface.

10. The method of claim 8, wherein the eyeglass lens as a major axis and a minor axis, the cylindrically-shaped interface having a curved profile across the major axis.

11. The method of claim 10, wherein the cylindrically-shaped interface has a straight profile across the minor axis.

12. The method of any one of claim 8, wherein the thin film comprises a holographic optical element.

13. The method of claim 12, wherein the holographic optical element is configured to act as a plane mirror or a plane transmission hologram.

14. The method of any one of claim 8, wherein the thin film is formed integrally with the first lens part or the second lens part.

15. The method of any one of claim 8, further comprising:
bonding the first and second lens parts with the thin film interposed to form an eyeglass lens blank;
milling an eye-facing surface of the eyeglass lens blank.

16. A method of manufacturing an eyeglass lens, the method comprising:
interposing a thin film between a first lens part and a second lens part, at a cylindrically-shaped interface between the first and second parts, wherein the thin film comprises a photosensitive material, the method further comprising:

recording a hologram on the photosensitive material to form a holographic optical element and wherein the step of recording a hologram on the photosensitive material comprises:

applying the photosensitive material to the cylindrically-shaped interface; and recording the hologram on the photosensitive material when on the cylindrically-shaped interface.

\* \* \* \* \*